Feb. 3, 1959 S. YANDO 2,872,523

ELECTRONIC SYSTEM UTILIZING TIME MODULATION

Filed Dec. 28, 1955 4 Sheets-Sheet 1

INVENTOR
STEPHEN YANDO

BY

ATTORNEY

Feb. 3, 1959 S. YANDO 2,872,523

ELECTRONIC SYSTEM UTILIZING TIME MODULATION

Filed Dec. 28, 1955 4 Sheets-Sheet 2

INVENTOR
STEPHEN YANDO

BY [signature]

ATTORNEY

Feb. 3, 1959 S. YANDO 2,872,523

ELECTRONIC SYSTEM UTILIZING TIME MODULATION

Filed Dec. 28, 1955 4 Sheets-Sheet 3

INVENTOR
STEPHEN YANDO

BY

ATTORNEY

INVENTOR
STEPHEN YANDO
BY [signature]
ATTORNEY 2,872,523

ELECTRONIC SYSTEM UTILIZING TIME MODULATION

Stephen Yando, Huntington, N. Y., assignor to Sylvania Electric Products Inc., a corporation of Massachusetts Application December 28, 1955, Serial No. 555,943

10 Claims. (Cl. 179—15.6)

Figure 1:
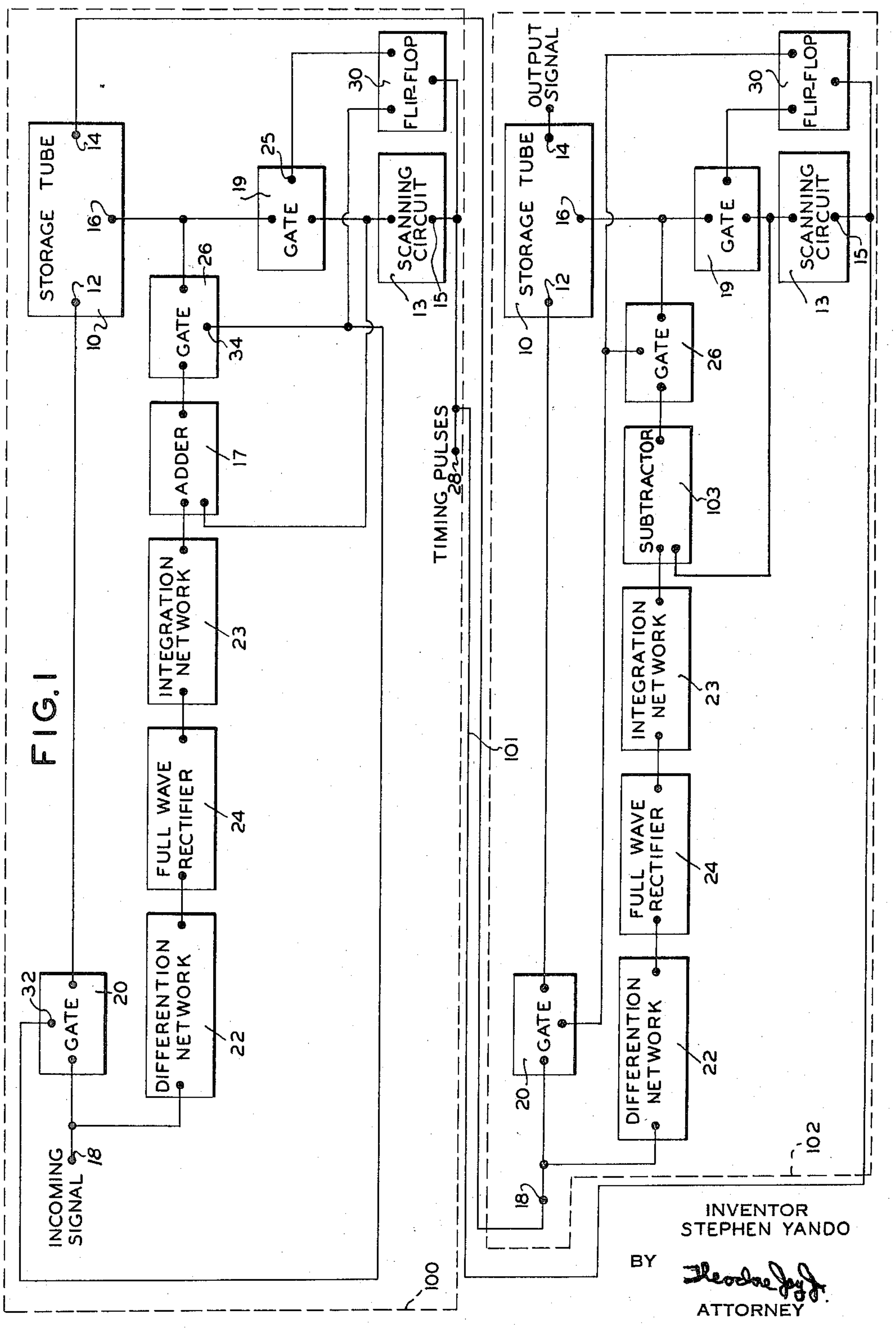

My invention is directed toward electronic systems utilizing time modulation.

Time modulation is a process wherein a first signal which, within a first time interval, exhibits a given amplitude variation, is modified in accordance with the control voltage to produce a second signal which, within a second and different time interval, exhibits a proportional variation in amplitude. The second signal is then said to be time modulated with respect to the first signal; a device adapted to perform this process is termed a time modulator.

The inverse of time modulation is time demodulation. Time demodulation is a process wherein a time modulated signal produced in the manner described above is modified in accordance with a second control voltage to reconstruct the original or first signal. A device adapted to perform this process is termed a time demodulator.

It will be seen that the above definitions of time modulation and demodulation encompass as particular applications, frequency and phase modulation systems. Consequently, it is difficult to overestimate the importance of time modulation and demodulation in such fields as radio, television and facsimile reproduction.

In my copending application Serial No. 549,636, filed November 29, 1955, now abandoned, I disclosed a new type of time modulator provided with an input circuit, a control circuit and an output circuit. An incoming signal which during a first time interval exhibits a given variation in amplitude is supplied to the input circuit. Means are provided for deriving a control voltage, from the incoming signal and supplying this control voltage to the control circuit. As a result, an output signal appears at the output circuit. The output signal within a second and different time interval exhibits a proportional variation in amplitude and hence is time modulated with respect to the incoming signal.

More specifically, an input time sequenced information bearing signal is subjected to a first time-domain, space-domain conversion to produce a position sequenced information bearing signal; the position sequenced information signal is then subjected to a second space-domain, time-domain conversion to produce an output time sequenced information bearing signal; means responsive to the input signal derives therefrom a control voltage which is effective during the first conversion to modify the signal undergoing conversion in such manner that the output signal is time modulated with respect to the input signal.

Still more specifically, the invention so disclosed includes in one embodiment a conventional storage tube assembly provided with a read-in electrode, a read-out electrode, and a scan control electrode. An incoming time sequenced signal is supplied during one interval to the read-in electrode; simultaneously, a first timing pulse is supplied to the scan control electrode to initiate the read-in operation. (This operation, of course, is a time-domain, space-domain conversion.) During the next successive interval the incoming signal is not supplied to the read-in electrode; however, a second timing pulse is supplied to the scan control electrode to initiate the read-out operation and an output time sequenced signal appears at the read-out electrode. (The read-out operation is a space-domain, time-domain conversion.)

When both read-in and read-out operations utilize the same scanning pattern, as is the situation in a conventional storage tube, the output signal is not time modulated as both output and input signals are substantially identical. Stated differently, each conversion is the reverse of the other. However, when the scanning patterns differ for each operation (in a manner described in more detail below), each conversion is no longer the reverse of the other, and the output and input signals are no longer identical. In this situation, the output signal will be time modulated with respect to the input signal.

Therefore, in the above described invention, I provide means responsive to the incoming signal to derive a control voltage therefrom. This control voltage is then used to modify the scanning pattern established during the read-in operation and the output signal therefore is likewise modified.

For example, the control voltage can be derived by first differentiating the incoming signal, then taking the absolute value of the differentiated values and integrating the same, and finally during the read-in operation adding the integrated voltage to or subtracting the integrated voltage from the scanning voltage produced within the tube assembly. The resultant composite voltage constitutes the control voltage. Consequently, the resultant position sequenced signal does not represent the incoming signal alone, but represents the incoming signal modified by the control voltage.

This control voltage is not supplied to the scan control electrode during the read-out operation, instead the output signal is produced in conventional manner. However the output signal is no longer identical with the input signal, as the output signal is a function of both the incoming signal and the control voltage. Specifically, in this example, the incoming signal is time modulated in accordance with the differentiated incoming signal to produce a time modulated output signal.

It will be apparent from the foregoing discussion that the time modulator device described above utilizes double domain conversion as distinguished from other devices which utilize single domain conversion.

Devices which are of this latter type include, for example, a cathode ray tube which derives an optical image or visual signal from a video signal. Here, the time sequenced information which is carried by the modulation envelope of the video signal is transformed to positional sequenced information displayed by the visual signal (without change in information content), and a single time-domain, space-domain conversion occurs. Another such device, for example, an image orthicon converts (without change in information content) a photoelectric image into a time sequenced video signal, and a single space-domain, time-domain conversion occurs.

When a single domain conversion is effected and the signal undergoing conversion is not modified by a control signal during the conversion, the input and output signals for devices of the latter type are equivalents. Thus, in the cathode ray tube example the raster is the position sequenced equivalent of the incoming time sequenced video signal, while in the image orthicon, the video signal is the time sequenced equivalent of the position sequenced photoelectric image.

In my experiments with the above described time modulator I have discovered that the output signal from the transformation device, which, as indicated previously, is time modulated with respect to the input signal and yet contains the same information as the input signal, can be demodulated to reconstruct the original input signal. Further, I have succeeded in developing a new and improved time demodulator which can be used in this fashion.

This demodulator, when used with a time modulator utilizing double domain conversion, can utilize either single or double domain conversion.

Accordingly, it is an object of the present invention to improve electronic systems utilizing time modulation.

Another object is to provide new and improved electronic systems utilizing time modulated and time demodulated signals.

Still another object is to provide a new and improved time demodulator.

Yet another object is to provide a new and improved communication system utilizing time modulators and demodulators.

Still another object is to provide a new and improved electronic system employing a time modulator of the double domain conversion type together with a time modulator of the single or double domain conversion type.

These and other objects will either be explained or become apparent hereinafter.

In the present invention, I provide a time demodulator provided with an input circuit, an output circuit and a control circuit. An output time modulated signal yielded by a time modulator of the type described in the above mentioned copending application is supplied to the input circuit of the demodulator. Means responsive to this modulator output signal derive therefrom a control voltage which is the inverse function of the control voltage utilized in the modulator and which is supplied to the control circuit of the demodulator. As a result, a demodulated output signal appears at the output circuit of the demodulator. This demodulated output signal is equivalent either in position sequenced form or time sequenced form to the incoming signal originally supplied to the modulator.

More specifically, I provide a time modulator of the double domain conversion type together with a time demodulator of the single or double domain conversion types.

In one embodiment, the time demodulator is also of the double domain conversion type. A first time sequenced signal is supplied to the input of the time modulator and is subjected to a first time space conversion and then to a second space time conversion, whereby a second time sequenced signal (time modulated with respect to the first signal) is yielded at the output of the first device. First means responsive to the first signal derives therefrom a first control voltage which is effective during the first conversion to modify the signal undergoing conversion in such manner that the second signal is a predetermined time modulated function of the first signal.

The second signal is then supplied to the input of the demodulator and is subjected to a third time-space conversion and then to a fourth space-time conversion whereby a third time sequenced signal is yielded at the output of the second device. Second means responsive to the second signal derives therefrom a second control voltage which is the inverse function of the first control voltage and which is effective during the third conversion to modify the signal undergoing conversion in such manner that the first signal and third signal (which is a predetermined time demodulated function of the second signal) are identical. It will be apparent that this embodiment can be used, for example, as a radio communication system.

In a second embodiment, the second time sequenced signal yielded by the time modulator is supplied to the input of a time demodulator of the single domain conversion type (for example, as used in a cathode ray tube) and is subjected to a third time-space conversion, whereby a third position sequenced (visual) signal is yielded at the output of the second device. Second means responsive to the second signal derives therefrom a second control voltage which is the inverse function of the first control voltage and which is effective during the third conversion to modify the signal undergoing conversion in such manner that the third signal is the position sequenced (visual) equivalent of the first signal. When the first signal has been derived as an output signal from an image orthicon or similar device, it will be apparent that the third signal is identical with that supplied to the input of the orthicon. Consequently, this second embodiment can be used as a television system.

It will be apparent that in both embodiments, the second signal can be supplied to a transmitter and the transmitted signal after arriving at a receiver can be supplied to a time demodulator; i. e., the modulator and demodulator need not be directly coupled together. Further, it will be apparent that the second signal can be recorded, as for example, on tape and then reproduced and supplied to the demodulator at a later time.

Figure 3A:
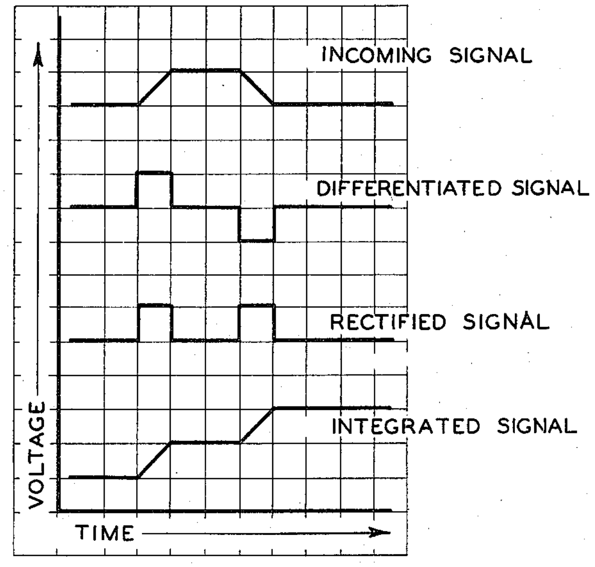
Figure 3B:
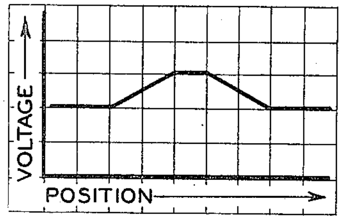
Figure 3C:
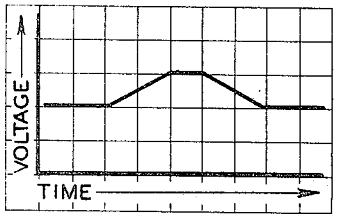
Figure 3D:
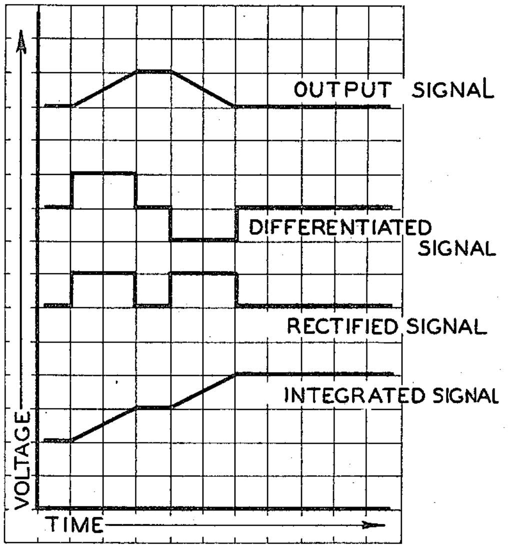
Figure 3E:
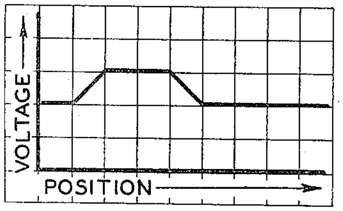
Figure 3F:
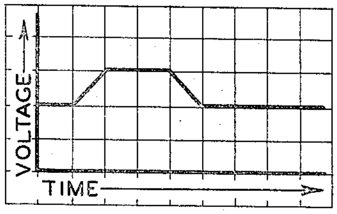
Figure 4:
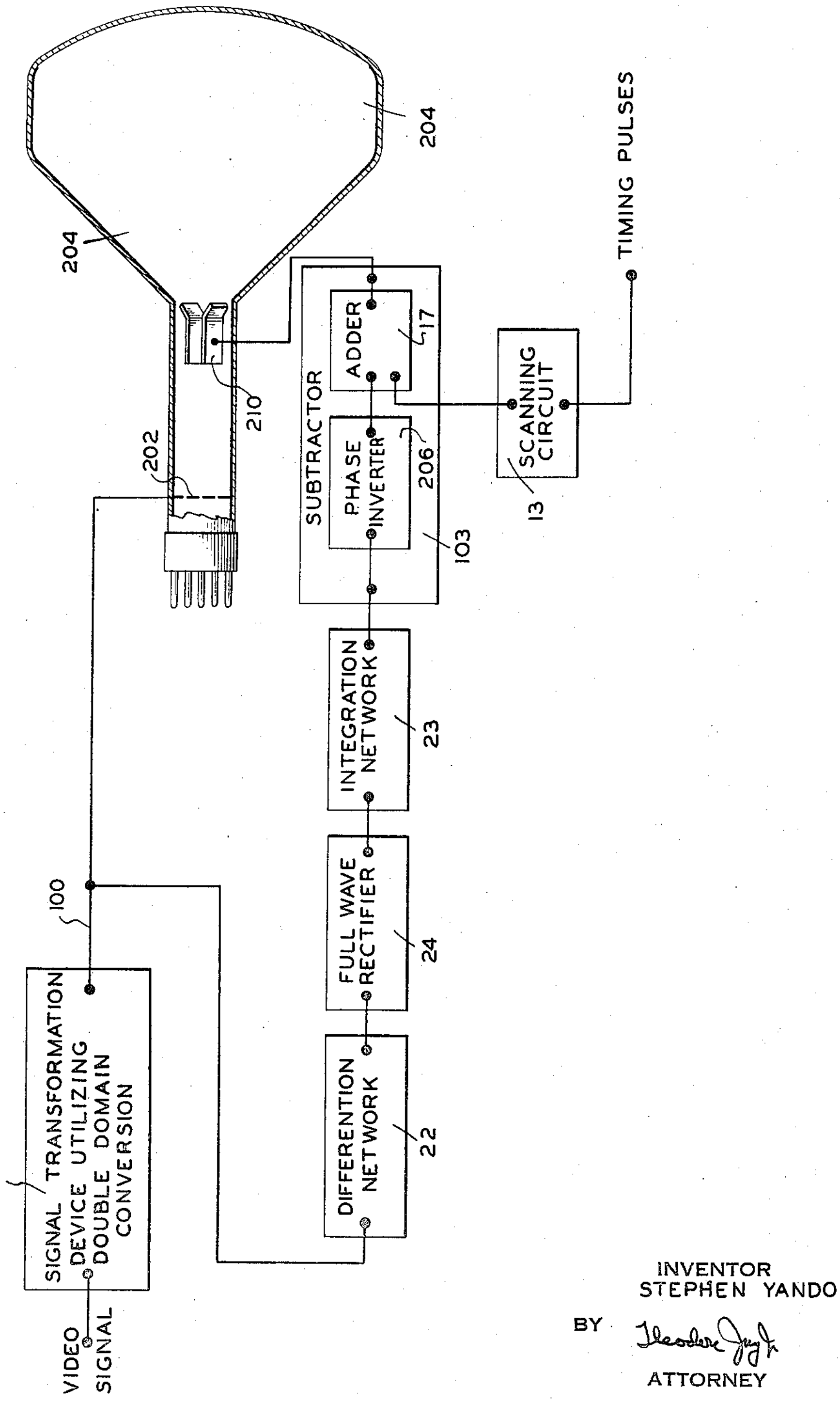

Illustrative embodiments of my invention will now be described in detail with reference to the accompanying drawings wherein:

Fig. 1 illustrates an embodiment of the invention;

Figs. 2*a*, 2*b*, 2*c*, and 2*d* are wave forms of the various scanning voltages used in the apparatus of Fig. 1;

Figs. 3*a*, 3*b*, 3*c*, 3*d*, 3*e*, and 3*f* are wave forms of various signal voltages utilized or developed in the apparatus of Fig. 1; and Fig. 4 illustrates another embodiment of my invention.

Referring now to Fig. 1, a time modulator of the double domain conversion type described in my copending application Serial No. 549,636 is identified at 100 and includes a conventional storage tube 10 (shown in block form) provided with a read-in electrode 12, a read-out electrode 14, and a deflection electrode 16. The deflection electrode is coupled through gate 19 to the output of a conventional scanning circuit 13. Circuit 13 is adapted to produce a conventional sawtooth scanning voltage (having the wave shape shown in Fig. 2*a*) upon the arrival of a timing pulse at scan control electrode 15.

An incoming signal having the wave shape shown in Fig. 3*a* appears at terminal 18 and is supplied to the input of gate 20. The output of gate 20 is coupled to electrode 12. This incoming signal is also supplied through a differentation network 22, a full wave rectifier 24, and an integration network 23, to an input of an adder 17. The output of the scanning circuit is supplied to another input of adder 17, and the output of adder 17 is supplied through gate 26 to deflection electrode 16.

Equidistantly spaced timing pulses appear at terminal 28 and are supplied both to electrode 15 and to the input of flip-flop 30. One output of flip-flop 30 is coupled to the conditioning electrodes 32 and 34 of gates 20 and 26 respectively; the other output is coupled to the conditioning electrode 25 of gate 19.

This circuit operates in the following manner. The incoming signal is supplied to gate 20 and at the same time is differentiated in network 22. The differentiated signal is rectified to derive the absolute value therefrom; this absolute value is integrated in network 23, and the integrated voltage supplied to the adder.

Figure 2A:
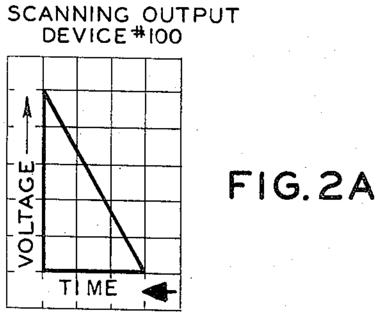
Figure 2B:
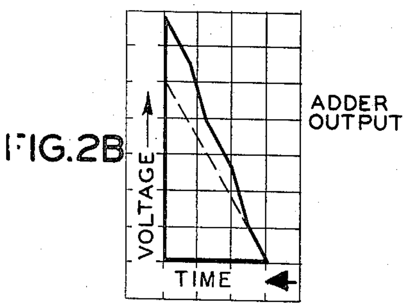

Upon the arrival of one timing pulse, flip-flop 30 attains a selected electric state, and at this point, gates 20 and 26 are opened while gate 19 is closed. The incoming signal is then supplied to the read-in electrode of the storage tube assembly. This time pulse is also supplied directly to the scan control electrode and initiates the read-in operation. The integrated voltage and the sawtooth voltage from the scanning circuit are added together as shown in Fig. 2*b*, and are supplied through gate 26 to the deflection electrodes of the storage tube.

The wave forms of the differentiated, rectified, and integrated voltages are shown in Fig. 3*a*.

The effect of the integrated voltage is to increase the scanning velocity each time the incoming signal is differentiated, so that the stored position sequenced signal has the spacial representation shown in Fig. 3*b*.

Upon the arrival of the next timing pulse, the flip-flop is urged into its other electric state and gates 20 and 26 are closed while gate 19 is opened. Thus, neither the integrated voltage nor the incoming signal can be supplied to the tube assembly at this time. This next pulse is supplied to the scan control electrode and the read-out operation is initiated. The scanning velocity developed during the read-out operation remains essentially constant due to the absence of the integrated voltage. The resultant output signal appearing at electrode 14 has the wave form shown in Fig. 3*c*.

It will be apparent from a comparison of Figs. 3*a* and 3*c* that the incoming and output signals in device 100 are not identical. The short sharp changes in slope of the incoming signal have been converted to relatively long, relatively gradual slope changes in the output signal. Effectively, the output signal represents the incoming signal time modulated in accordance with the first derivative of the incoming signal.

Figure 2C:
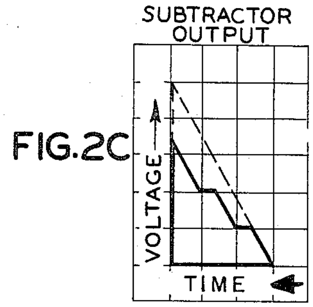
Figure 2D:
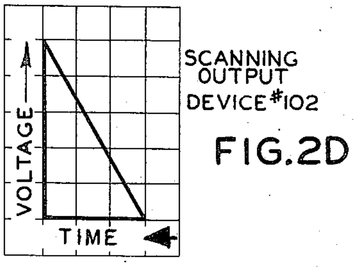

The output signal from device 100 is supplied through a suitable transmission medium, in this example, a cable 101, to the input of a time demodulator 102. Demodulator 102 differs only from modulator 101 in that the adder 17 is replaced by a subtractor 103. The purpose of subtractor 103 is to subtract the integrated voltage yielded by integrator network 23 of device 102 for the sawtooth voltage of the scanning circuit of device 102 as shown in Figs. 2*c* and 2*d*. (It will be noted that the integrated and sawtooth voltages are added together to produce the first control voltage while the integrated and sawtooth voltages are subtracted from each other to produce the second control voltage. Thus, these two control voltages are inverse functions of each other.)

The wave forms of the differentiated, rectified and integrated voltages utilized in device 102 are shown in Fig. 3*d*.

The action of device 102 is synchronized with device 100 by using the same timing pulses to control the flip-flops of both devices, or alternatively by synchronizing both flip-flops in conventional manner as, for example, by superimposing the timing pulses of the incoming signal as synchronization pulses in the manner conventionally utilized in television systems.

The gating connections in both devices are arranged in reverse sense so that when device 100 is subjected to a read-in or read-out operation, device 102 is subjected to a read-out or read-in operation.

As indicated previously, the addition of the integrated voltage to the scanning voltage in device 100 caused the scanning velocity to be increased each time the incoming signal was differentiated.

In device 102, the integrated voltage is subtracted from the scanning voltage so that the scanning velocity is decreased each time the output signal from device 100 (or, expressed differently, the input signal to device 102) is differentiated in device 102. The net result is that the incoming time sequenced signal shown in Fig. 3*c* is stored with the spacial representation shown in Fig. 3*e* in the storage tube of device 102 and, during the read-out operation of this device, an output signal having the wave shape shown in Fig. 3*f* is produced.

Comparison of Figs. 3*a* and 3*f* will show that the input signal to device 100 and the output signal for device 102 are identical.

The modulators and demodulators thus far described alternatively store and release signal information.

However, these apparatus can be so modified, as described in the above-mentioned copending application, that signal information can be stored and released continuously. This can be accomplished by using two storage tubes which are so interconnected that while one tube is subjected to a read-in operation, the other tube is subjected to a read-out operation. Further details on this modification can be found in the aforesaid application.

Further, two devices each of which alternately store and release information, can be connected in parallel and arranged to act in opposite sense so that again signal information is stored and released continuously.

Referring now to Fig. 4, there is shown in block form at 200 a device utilizing double domain conversion.

The incoming signal supplied to device 200 is a time sequenced video signal supplied for example from an image orthicon (not shown). The device derives a time sequenced output signal from the incoming signal in the same manner as before. This output signal is supplied, for example, by cable 100 or other transmission media to the intensity control grid 202 of a conventional cathode ray tube 204. This signal is also supplied through a differentation network 22, a full wave rectifier 24, and an integration network 23 to an input of subtractor 103. Subtractor 103, in this example, comprises a phase inverter 206 and an adder 17.

The sawtooth scanning voltage from a scanning circuit 13 is supplied to the subtractor 103 whereby the deflection voltage supplied to the deflection electrodes 210 (or an electromagnetic deflection circuit of equivalent design if the tube is of the electromagnetic type) represents the difference between the integrated and sawtooth scanning voltages in the same manner as before.

The cathode ray tube then, when controlled in this fashion, converts the time sequenced signal yielded at the output of device 200 into a visual signal which is equivalent to the original photoelectric image impressed on the image orthicon.

The scanning circuit of the cathode ray tube is actuated by the same timing pulses utilized in device 200 in the same manner as the scanning circuit of device 102 in Fig. 1.

Of course, second and higher derivatives can be used either in addition with or in substitution for the first derivative function used in Fig. 1. Further, it will be apparent that derivative functions need not be used. The integrated voltage can be replaced by another voltage which is dependent upon some other function of the incoming signal and, the system will function in the same general manner.

Moreover, it will be apparent that in either Fig. 1 or Fig. 4, the output signal yielded by device 100 or 200 can be supplied to a recorder, as for example a tape recorder, and at some later time an output signal for the recorder can be supplied as an input signal to device 102 or cathode ray tube 204.

In certain types of storage tubes and cathode ray tubes, the brightness of the storage change or the brightness of the spot of the cathode ray tube will vary with the scanning velocity. In this situation, a suitable brightness correction is required. This correction can be accomplished by techniques well known to the art.

While I have shown and pointed out my invention as applied above, it will be apparent to those skilled in the art that many modifications can be made within the scope and sphere of my invention as defined in the claims which follow.

What is claimed is:

1. In combination, first and second transformation devices, each device adapted to perform a first time-domain, space-domain conversion on an incoming time sequenced signal and to perform a second space-domain, time-domain conversion on said converted signal to produce a time sequenced output signal; means coupled to said devices to initiate each conversion in sequence, the conversions for both devices being synchronized in such manner that the first conversion of the first device and the second conversion of the second device occur simultaneously; means to supply a first incoming signal to said first device; means responsive to said first incoming signal to derive therefrom a first control voltage; means to apply said first control voltage to said first device during said first conversion whereby the output signal yielded by said first device is a function both of said incoming signal and of said first control votlage; means to supply said first device output signal as a second incoming signal to said second device; means responsive to said second incoming signal to derive therefrom a second control voltage, said second control voltage being the inverse function of the first control voltage; means to supply said second control voltage to said second device during the first conversion whereby the output signal yielded by said second device is a function both of said second incoming signal and said second control voltage, the first incoming signal and the second device output signal being substantially identical.

2. In combination, a first signal transformation device adapted to perform an initial time-domain, space-domain conversion on an incoming time sequenced signal and to perform a subsequent space-domain, time-domain conversion on said converted signal to produce a first time sequenced output signal; means coupled to said first device to periodically initiate each conversion in sequence; means responsive to said incoming signal to derive a first control voltage therefrom; means to apply said first control voltage to said first device during the initial conversion whereby said first output signal is a function both of said incoming signal and of said first control voltage; a second transformation device adapted to perform a time-domain, space-domain conversion on said first output signal to produce a second position sequenced output signal; means responsive to said first output signal to derive a second control voltage therefrom, said second control voltage being the inverse function of said first control voltage; means to apply said second control voltage to said second device during said time-domain, space-domain conversion whereby the second output signal is a function both of said first output signal and said second control voltage, the second output signal being the position sequenced equivalent of the time sequenced incoming signal.

3. A method for deriving from a time sequenced incoming signal a position sequenced output signal which comprises the steps of subjecting said incoming signal to a first time-domain, space-domain conversion; subjecting said converted incoming signal to a second space-domain, time-domain conversion to produce an intermediate output signal; deriving a first control voltage from said incoming signal; subjecting the incoming signal undergoing conversion to said first control voltage during one of said first and second conversions whereby said intermediate output signal is a function both of said incoming signal and said first control voltage; subjecting the intermediate signal to a third time-domain, space-domain conversion to produce said position sequenced output signal; deriving a second control voltage which is the inverse function of the first control voltage from said intermediate signal; subjecting the intermediate signal to said second control voltage during said third conversion whereby said position sequenced output signal is a predetermined function both of said intermediate signal and said second control voltage and the position sequenced signal is equivalent to said time sequenced incoming signal.

4. In combination, a time modulator provided with an input circuit, an output circuit and a control circuit, said modulator being adapted to alternatively store and release any signals applied to the modulator input circuit; means to supply an incoming signal to the modulator input circuit at a first set of intervals, adjacent intervals in the first set exhibiting a separation at which the signal supplied during each of said first set of intervals is first stored then released during said each first set interval; means responsive to said incoming signal to derive therefrom a first control voltage; means to supply said first voltage to the modulation control circuit during each of said first set intervals, said first voltage being effective during the modulator signal storage operations to time modulate the incoming signal in accordance with said first voltage to produce a time modulated output signal at the modulator output circuit; a time demodulator provided with an input circuit, an output circuit and a control circuit, said demodulator being adapted to alternatively store and release any signals supplied to the demodulator input circuit, said modulator and demodulator being synchronized in such manner that the signal storage and signal release operations of the modulator are synchronized with the signal release and signal storage operations of the demodulator; means to supply the output signal yielded by the modulator to the demodulator input circuit at a second set of intervals, adjacent intervals in the second set exhibiting a separation at which the signal supplied to the demodulator input circuit is first stored and then released from said demodulator during each of said second set of intervals; means responsive to said modulator output signal to derive therefrom a second control voltage which is the inverse function of said first control voltage; and means to supply said second voltage to the demodulator control circuit during each of the said second set intervals, said second voltage being effective during the demodulator signal storage operations to time modulate the modulated output signal in accordance with said second voltage to produce a signal at the output of the demodulator which is substantially identical with said incoming signal.

5. In combination, a time modulator provided with an input circuit, an output circuit and a control circuit, said modulator being adapted to alternatively store and release any signals applied to the modulator input circuit; means to supply an incoming time sequenced signal to the modulator input circuit at a first set of intervals, adjacent intervals in the first set exhibiting a separation at which the signal supplied during each of said first set of intervals is first stored then released during said each first set interval; means responsive to said incoming signal to derive therefrom a first control voltage; means to supply said first voltage to the modulation control circuit during each of said first set intervals, said first voltage being effective during each of the modulator signal storage operations to time modulate the incoming signal in accordance with said first voltage to produce a time modulated, time sequenced output signal at the modulator output circuit; a time demodulator provided with an input circuit, an output circuit and a control circuit, said demodulator being adapted to convert any time sequenced signals supplied to the demodulator input circuit into position sequenced form; means to supply the output signal yielded by the modulator to the demodulator input circuit; means responsive to said modulator output signal to derive therefrom a second control voltage which is the inverse function of said first control voltage; and means to supply said second voltage to the demodulator control circuit to time modulate the modulated output signal in accordance with said second voltage to produce a position sequenced signal at the output of the demodulator which is substantially equivalent to said incoming time sequenced signal.

6. The combination as set forth in claim 5 wherein said demodulator is provided with a cathode ray tube.

7. The combination as set forth in claim 6 wherein said modulator is provided with a storage tube.

8. In combination, a time modulator including at least one storage tube and provided with an input circuit, an output circuit and a control circuit; a time demodulator including at least one storage tube and provided with an input circuit, an output circuit and a control circuit, the modulator output circuit being coupled to the demodulator input circuit; means to supply an incoming signal to the modulator input circuit, said incoming signal within a first time interval exhibiting a given variation in amplitude; first means coupled between the modulator input and control circuits to derive a first control voltage for said incoming signal and to supply said first voltage to the modulator control circuit, said incoming signal being time modulated in accordance with said first voltage to produce at the modulator output circuit a modulator output signal which within a second and different time interval exhibits a proportional amplitude variation, said modulator output signal being supplied to the demodulator input circuit; and second means coupled between the demodulator input and control circuits to derive therefrom a second control vlotage which is the inverse function of the first control voltage and to supply said second voltage to the demodulator control circuit, the modulator output signal being demodulated in accordance with the second voltage to produce a demodulated signal at the demodulator output circuit.

9. In combination, a time modulator including at least one storage tube and provided with an input circuit, an output circuit and a control circuit; a time demodulator including a cathode ray tube and provided with an input circuit, an output circuit and a control circuit, the modulator output circuit being coupled to the demodulator output circuit being coupled to the demodulator input circuit; means to supply an incoming signal to the modulator input circuit, said incoming signal within a first time interval exhibiting a given variation in amplitude; first means coupled between the modulator input and control circuits to derive a first control voltage for said incoming signal and to supply said first voltage to the modulator control circuit, said incoming signal being time modulated in accordance with said first voltage to produce at the modulator output circuit a modulator output signal which within a second and different time interval exhibits a proportional amplitude variation, said modulator output signal being supplied to the demodulator input circuit; and second means coupled between the demodulator input and control circuits to derive therefrom a second control voltage which is the inverse function of the first control voltage and to supply said second voltage to the demodulator control circuit, the modulator output signal being demodulated in accordance with the second voltage to produce a demodulated signal at the demodulator output circuit.

10. In combination, a time modulator provided with an input circuit, an output circuit and a control circuit, said modulator including first and second storage tubes adapted to alternatively store and release signals supplied thereto, said tubes being synchronized in a manner at which one tube stores said signals, while the other tube releases said signals; a time demodulator provided with an input circuit, an output circuit and a control circuit, the modulator output circuit being coupled to the demodulator input circuit; means to supply an incoming signal to the modulator input circuit, said incoming signal within a first time interval exhibiting a given variation in amplitude; first means coupled between the modulator input and control circuits to derive a first control voltage for said incoming signal and to supply said first voltage to the modulator control circuit, said incoming signal being time modulated in accordance with said first voltage to produce at the modulator output circuit a modulator output signal which within a second and different time interval exhibits a proportional amplitude variation, said modulator output signal being supplied to the demodulator input circuit; and second means coupled between the demodulator input and control circuits to derive therefrom a second control voltage which is the inverse function of the first control voltage and to supply said second voltage to the demodulator control circuit, the modulator output signal being demodulated in accordance with the second voltage to produce a demodulated signal at the demodulator output circuit.

References Cited in the file of this patent

UNITED STATES PATENTS

| | | |
|---|---|---|
| 2,517,618 | Young | Aug. 8, 1950 |
| 2,596,199 | Bennett | May 13, 1952 |
| 2,672,517 | Boughtwood | Mar. 16, 1954 |
| 2,680,151 | Boothroyd | June 1, 1954 |
| 2,724,740 | Cutler | Nov. 22, 1955 |